United States Patent
Kim (10) Patent No.: US 8,023,378 B2
(45) Date of Patent: Sep. 20, 2011

(54) METHOD OF RECORDING AND REPRODUCING DATA

(75) Inventor: Hyeongcheol Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 11/828,872

(22) Filed: Jul. 26, 2007

(65) Prior Publication Data

US 2008/0117757 A1  May 22, 2008

(30) Foreign Application Priority Data

Nov. 17, 2006  (KR) .......................... 10-2006-0113672

(51) Int. Cl.
 *G11B 27/36* (2006.01)
(52) U.S. Cl. .................. 369/53.17; 369/53.2; 369/53.24
(58) Field of Classification Search ............... 369/30.09, 369/47.14, 53.17, 13.1, 53.15, 53.2, 53.24; 347/225
See application file for complete search history.

(56) References Cited

U.S. PATENT DOCUMENTS

| 6,215,746 B1 * | 4/2001 | Ando et al. ................ 369/53.2 |
| 7,145,586 B2 * | 12/2006 | Anderson et al. ............ 347/225 |
| 2001/0040862 A1 * | 11/2001 | Ando et al. ................ 369/275.3 |
| 2002/0048224 A1 * | 4/2002 | Dygert et al. ..................... 369/1 |
| 2004/0120226 A1 * | 6/2004 | Ryu ........................... 369/30.09 |
| 2007/0177467 A1 * | 8/2007 | Ando et al. ................ 369/13.01 |
| 2008/0068954 A1 * | 3/2008 | Hwang et al. ............. 369/53.17 |
| 2009/0034379 A1 * | 2/2009 | Ueda et al. ................ 369/47.14 |

FOREIGN PATENT DOCUMENTS

| KR | 1020060026508 A | 3/2006 |
| KR | 1020060060914 A | 6/2006 |
| KR | 1020060067341 A | 6/2006 |

\* cited by examiner

*Primary Examiner* — Thuy Pardo
(74) *Attorney, Agent, or Firm* — Birch, Stewart, Kolasch & Birch, LLP

(57) ABSTRACT

A method of recording data, as embodied, includes creating and temporarily storing first management information for the data recorded before a recording failure occurs, when the recording failure occurs during recording of the data on a recording medium; continuously recording the data starting from a subsequent available recording location; and creating second management information for the data recorded after the occurrence of the recording failure, and recording the second management information on the recording medium in connection with the temporarily stored first management information when recording is completed.

12 Claims, 7 Drawing Sheets

METHOD OF RECORDING AND REPRODUCING DATA

This Nonprovisional Application claims priority under 35 U.S.C. §119(a) on Patent Application No. 10-2006-0113672 filed in Korea on Nov. 17, 2006, the entire contents of which are hereby incorporated by reference.

BACKGROUND OF THE INVENTION

1. Field of the Invention

The present invention relates to a method of recording and reproducing data.

2. Description of the Related Art

Recently, an optical disc device capable of recording audio and video data, which is input in real time, has been commercialized and widely used. Broadcast programs received through a tuner or moving image data input through an external terminal are compressed as Moving Picture Experts Group (MPEG) data streams using a compression technique, such as MPEG-1/2, and are recorded in real time on an optical disc for recording, such as a Recordable/Rewritable Compact Disc (CD-R/RW), a Recordable Digital Versatile Disc DVD-R/+R), a Rewritable DVD (DVD-RWI+RW), or DVD-Random Access Memory (RAM).

Figure 1:
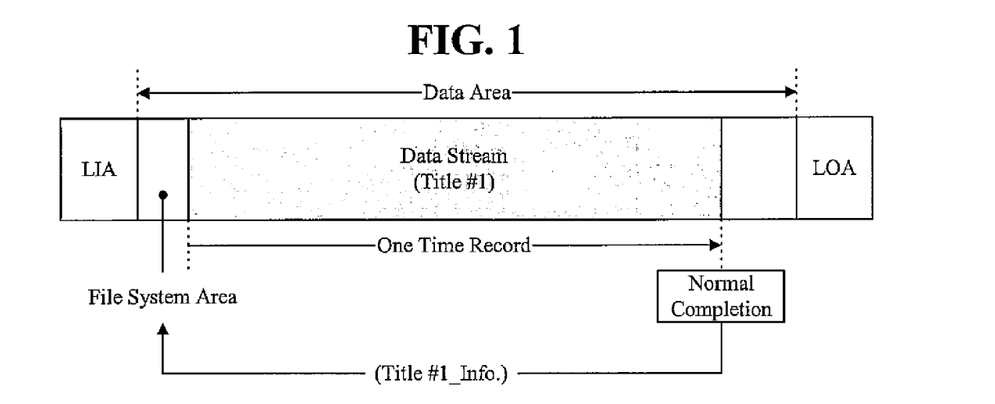
FIGS. 1 and 2 are diagrams showing embodiments of a method of recording data in a typical optical disc device.

An optical disc device continuously records input audio/video data in the data area of a disc. When the recording of data has been completed, the optical disc device creates management information required to control the reproduction of the recorded data, for example, navigation information, as shown in FIG. 1, and then records the management information in a file system area allocated in the leading part of the data area.

Figure 2:
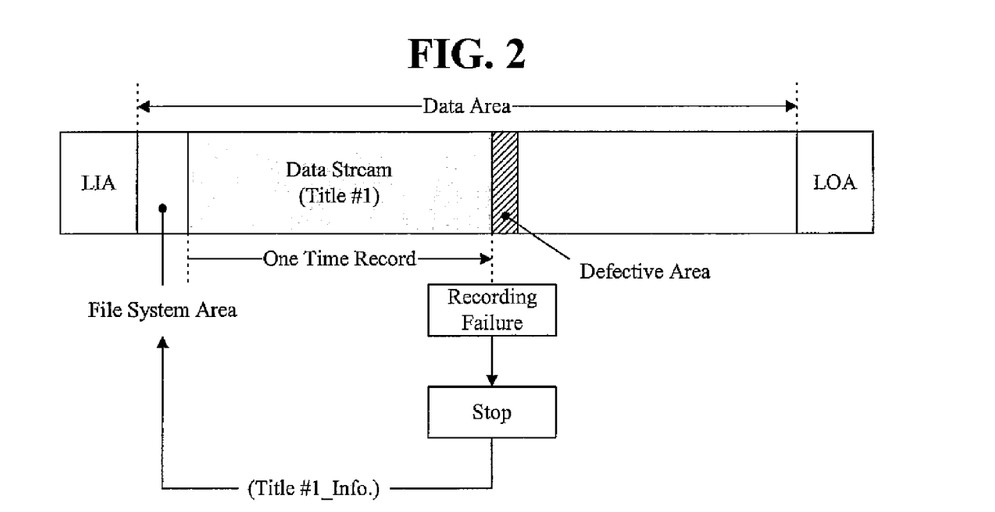

Meanwhile, when the recording of input audio/video data fails due to a defective area, caused by impurities or scratches, or servo errors during the recording of the data in the data area of the disc, the optical disc device forcibly terminates a recording operation, defines the data recorded normally before the recording failure occurs as a single title, creates management information about the title, and records the management information in the file system area, as shown in FIG. 2. This operation is performed so that the data recorded before the recording failure occurs can be normally reproduced.

However, when a recording failure occurs, the recording operation is forcibly terminated, so that data, input after the occurrence of the failure, is not recorded. Therefore, it is impossible to view or play the data input after the occurrence of the failure.

SUMMARY OF THE INVENTION

In view of the above problems occurring in the related art, an object of the present invention is to provide a method of efficiently recording data, input after the occurrence of a recording failure, even if a recording failure occurs when real-time input data is recorded on a recording medium, and a method of reproducing the recorded data.

In accordance with an aspect of the present invention to accomplish the above object, there is provided a method of recording data, as embodied, comprising creating and temporarily storing first management information for the data recorded before a recording failure occurs, when the recording failure occurs during recording of the data on a recording medium; continuously recording the data starting from a subsequent available recording location; and creating second management information for the data recorded after the occurrence of the recording failure, and recording the second management information on the recording medium in connection with the temporarily stored first management information when recording is completed.

In accordance with another aspect of the present invention to accomplish the above object, there is provided a method of reproducing data, as embodied, comprising checking management information for controlling reproduction of data recorded on a recording medium; displaying a plurality of titles on a screen as a single virtual title when link information for connecting the plurality of titles is included in the management information; and serially reproducing the plurality of titles connected through the link information when reproduction of the virtual title is requested.

In accordance with a further aspect of the present invention to accomplish the above object, there is provided a method of reproducing data, as embodied, comprising checking management information for controlling reproduction of data recorded on a recording medium; displaying a plurality of titles on a screen as a plurality of separate titles when link information for connecting the plurality of titles is included in the management information; and serially reproducing the plurality of titles connected through the link information when reproduction of the separate titles is requested.

BRIEF DESCRIPTION OF THE DRAWINGS

The above and other objects, features and other advantages of the present invention will be more clearly understood from the following detailed description, taken in conjunction with the accompanying drawings, in which.

DETAILED DESCRIPTION OF ILLUSTRATED EMBODIMENTS

Hereinafter, embodiments of a method of recording and reproducing data according to the present invention will be described in detail with reference to the attached drawings.

Figure 3:
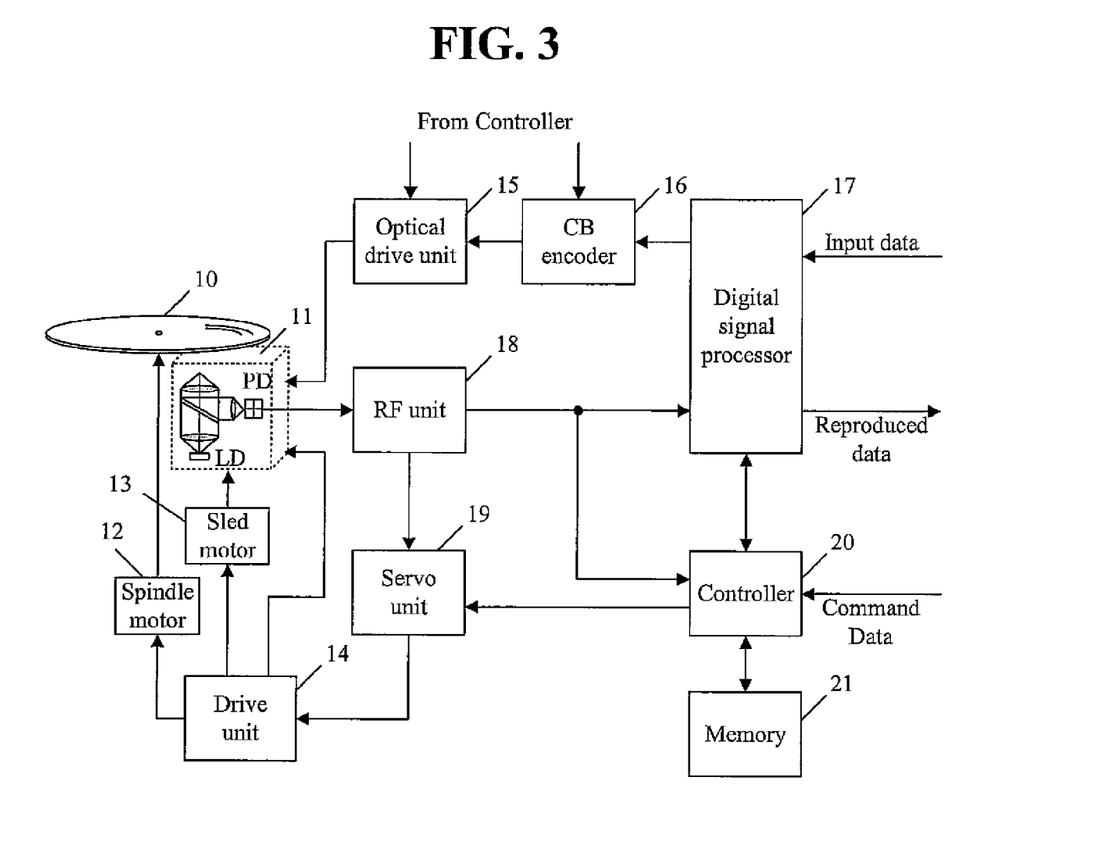
FIG. 3 is a diagram showing the construction of an optical disc device to which an embodiment of the present invention is applied.

The data recording and reproducing method of the embodiments of the present invention can be applied to an optical disc device, such as a Digital Versatile Disc (DVD)-recorder capable of recording data on various types of computer recordable media or optical recorder device recordable media, for example, optical discs, such as CD-R/RW, DVD-R/+R, DVD-RW/+RW, and DVD-RAM. The construction of the optical disc device to which an embodiment of the present invention is applied is shown in FIG. 3.

The optical disc device includes an optical pickup 11, a spindle motor 12, a sled motor 13, a driving unit 14, an optical drive unit 15, a channel bit encoder 16, a digital signal processing unit 17, a Radio Frequency (RF) unit 18, a servo unit 19, a controller 20, and memory 21.

When a recording request for an external input signal or a broadcast signal is received from a user, the controller 20 controls the optical drive unit 14, the channel bit encoder 16, and the servo unit 19, thereby recording input data or data MPEG-encoded by the digital signal processor 17 on an optical disc for recording 10.

Figure 4:
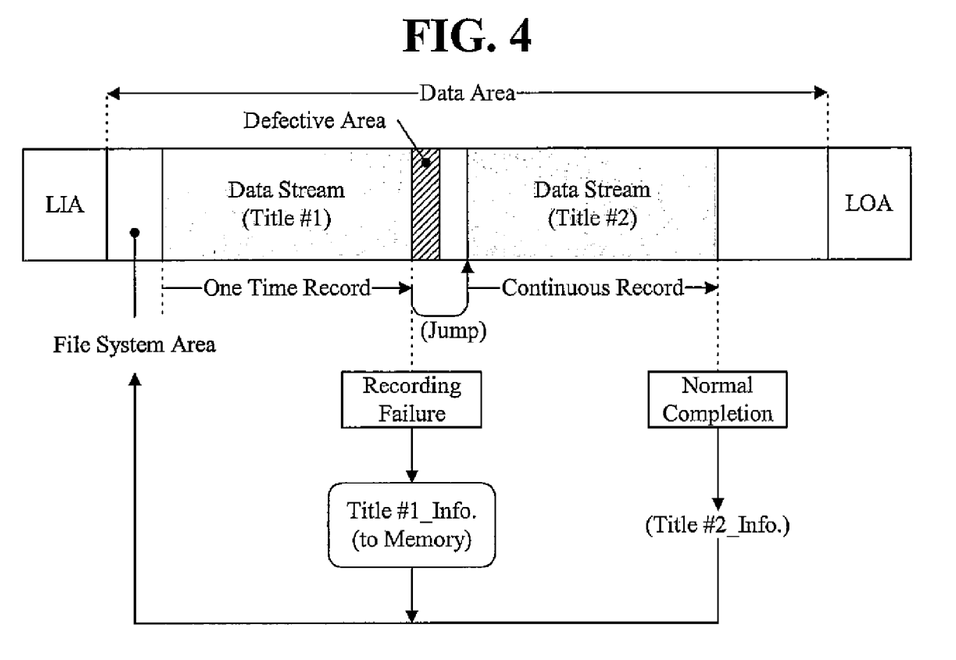
FIG. 4 is a diagram showing an embodiment of a method of recording data according to an embodiment of the present invention.

As shown in FIG. 4, the controller 20 separates a data stream, normally recorded before a recording failure occurs, as a single title, for example, a first title (Title #1), as shown in FIG. 4, when a recording failure occurs during the recording of data on the optical disc 10.

Further, the controller 20 searches for an available location at which data can be subsequently recorded and continues to record new data at the location while creating management information required to control the reproduction of the first title, for example, first title information (Title #1_Info) and temporarily storing the first title information in the memory 21 in a state in which a current operation mode is continuously maintained in a recording mode.

Thereafter, when the recording operation is normally completed during the recording of new data, the controller 20 separates data, normally recorded before the normal completion of the recording operation, as a new title, for example, a second title (Title #2), creates second title information (Title #2_Info), and additionally includes link information, required to reproduce the first and second titles in connection with each other, both in the created second title information and in the first title information, which is temporarily stored in the memory 21, and records the first and second title information in the file system area of the optical disc 10.

Further, when a reproduction operation is performed on the optical disc 10, the controller 20 connects and reproduces the first and second titles with reference to the link information. This operation is described in detail below.

Figure 5:
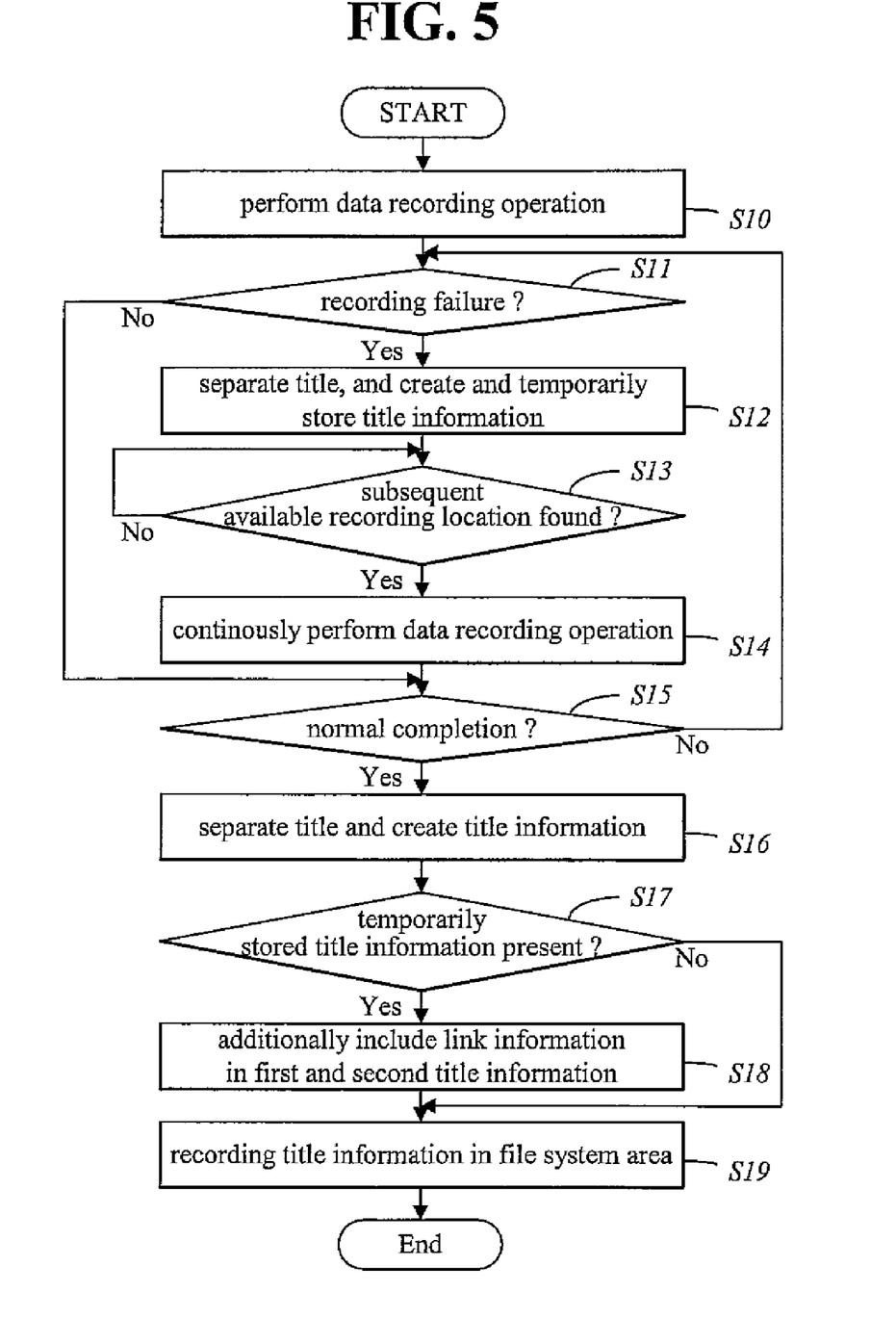
FIG. 5 is a flowchart showing the operation of a method of recording data according to an embodiment of the present invention.

FIG. 5 is a flowchart showing the operation of a method of recording data according to an embodiment of the present invention.

The controller 20 controls the optical drive unit 15, the channel bit encoder 16, the digital signal processor 17, and the servo unit 19 in response to a user's request, thereby performing an operation of recording an MIPEG data stream, which is input in real time, as in the case of a broadcast program, in the data area of the optical disc 10 at step S10.

When a recording failure occurs due to a defective area caused by impurities or scratches, or servo errors occurring in the defective area during the data recording operation at step S11, the controller 20 automatically separates data streams, normally recorded before the occurrence of the recording failure, as a first title, creates first title information (Title #1_Info) as management information required to control the reproduction of the first title, and temporarily stores the first title information in the memory 21 at step S12, as shown in FIG. 4. At this stage, the current operation mode is maintained in a recording mode. The first title information may include a title name, a recording start address, a recording end address, and identification information, indicating that the first title is an automatically separated title, for example, a separation flag, which is set to '1' (Separation Flag='1').

Further, the controller 20 controls both the servo unit 19 and the optical drive unit 15, thereby searching for a subsequent available recording location while allowing the location of the optical disc 10, accessed by the optical pickup 11, to jump from the inner circumference toward the outer circumference of the optical disc 10 at preset regular intervals, for example, at intervals of a predetermined number of Error Correction Code (ECC) Blocks, or searching for a subsequent available recording location by detecting a reproduced RF signal while recording preset test data.

New data that is input during the search for the subsequent available recording location after the recording failure occurs is buffered in the buffer memory of the channel bit encoder 16 or the digital signal processor 17 so that the new data can be recorded on the optical disc 10 after the subsequent available recording location has been found. When the time for which the subsequent available recording location is searched for increases, part or all of the data temporarily stored in the buffer memory may be deleted, and subsequently input data may be stored in the buffer memory instead. That is, part of the data input in real time may or may not be recorded on the optical disc 10, depending on the size of the buffer memory and the search time.

Meanwhile, when the subsequent available recording location is found through the above-described search operation at step S13, the controller 20 continuously records the data temporarily stored in the buffer memory and a data stream input in real time in the data area of the optical disc 10 starting from the found location at step S14.

After the data recording operation has been normally completed in response to the user's request, etc. at step S15, the controller 20 separates the data stream, normally continuously recorded in the data area starting from the found location after the occurrence of the recording failure, as a new title, for example, a second title, and creates second title information (Title #2_Info), as shown in FIG. 4 at step S16. The second title information may also include a title name, a recording start address, a recording end address, and identification information, indicating that the second title is automatically separated, for example, a separation flag, which is set to '1'.

Figure 6:
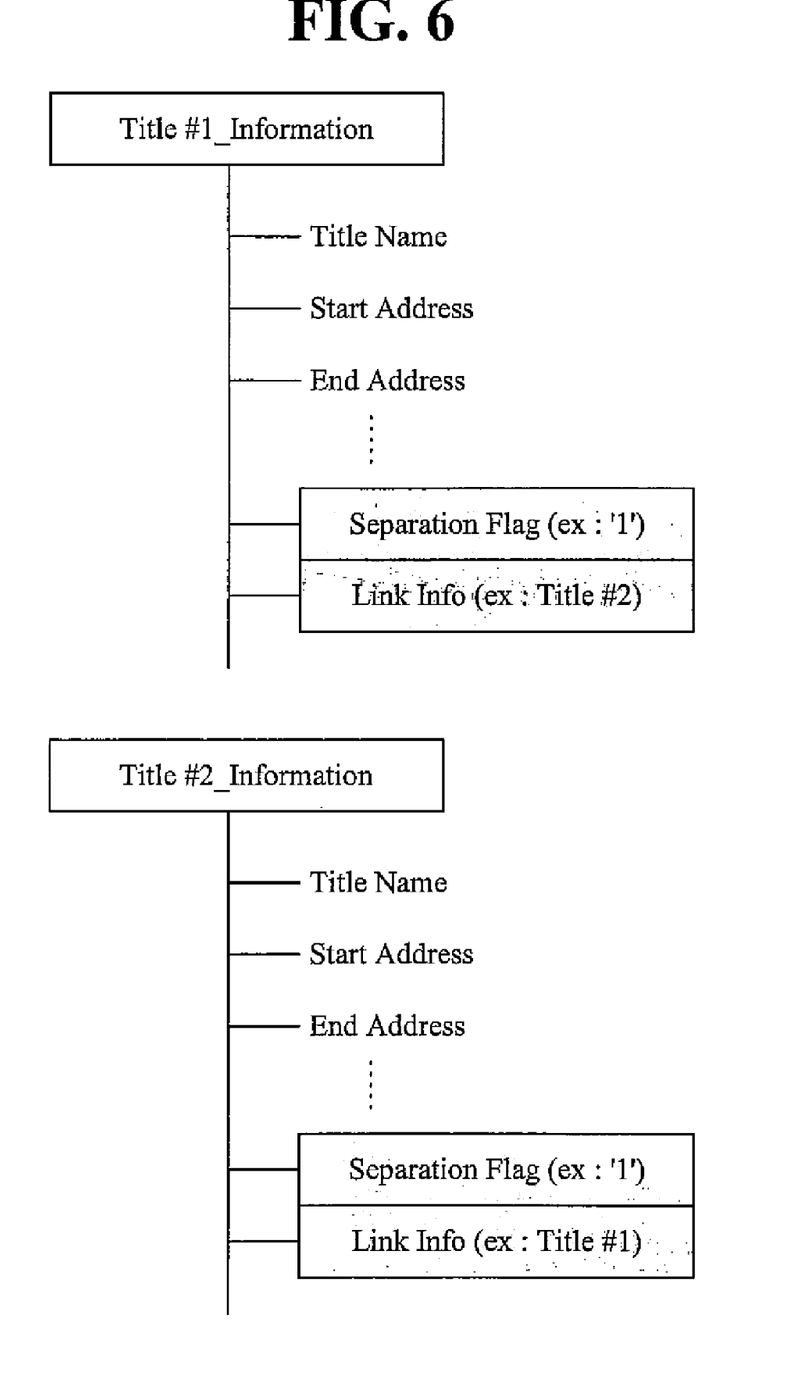
FIG. 6 is a diagram showing an embodiment in which link information is additionally recorded in title information according to an embodiment of the present invention.

Further, the controller 20 determines whether title information temporarily stored in the memory 21 is present before recording the second title information in the file system area of the optical disc 10 at step S17. If it is determined that the temporarily stored title information, for example, the first title information, is present at step S17, the controller 20 adds link information, required to reproduce respective titles in connection with each other, to the second title information and the first title information temporarily stored in the memory, as shown in FIG. 6, at step S18. For example, in the first title information, the separation flag, set to '1,' and link information for indicating the second title are recorded. In the second title information, the separation flag, set to '1,' and the link information for indicating the first title are recorded.

Further, the controller 20 records both the first title information and the second title information, each having the separation flag and link information recorded therein, in the file system area of the optical disc 10, as navigation information at step S19.

Meanwhile, when a title list screen is displayed in response to the user's request, the controller 20 determines that the first and second titles are automatically separated titles with reference to the separation flag and the link information additionally recorded in each of the first title information and the second title information.

Figure 7:
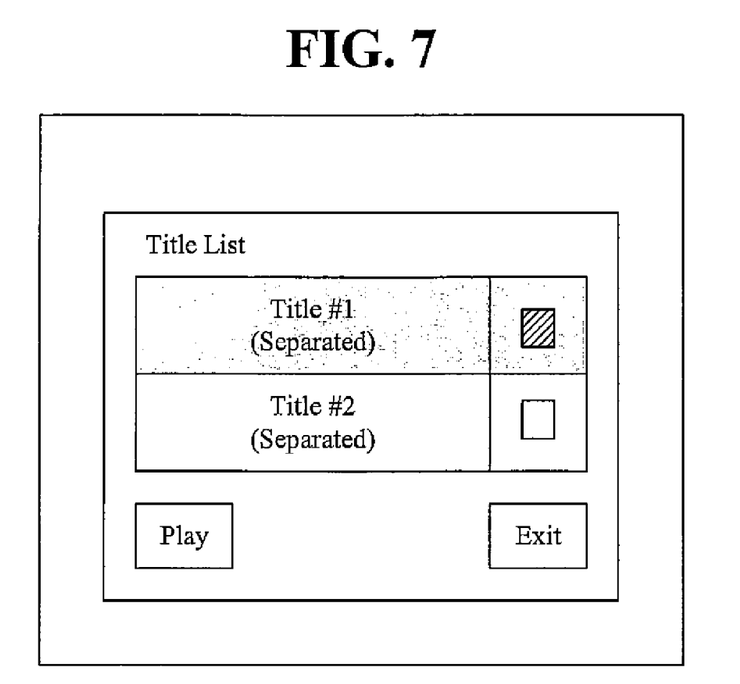
FIGS. 7 and 8 are diagrams showing examples of a title list screen displayed by a method of reproducing data according to an embodiment of the present invention.
Figure 8:
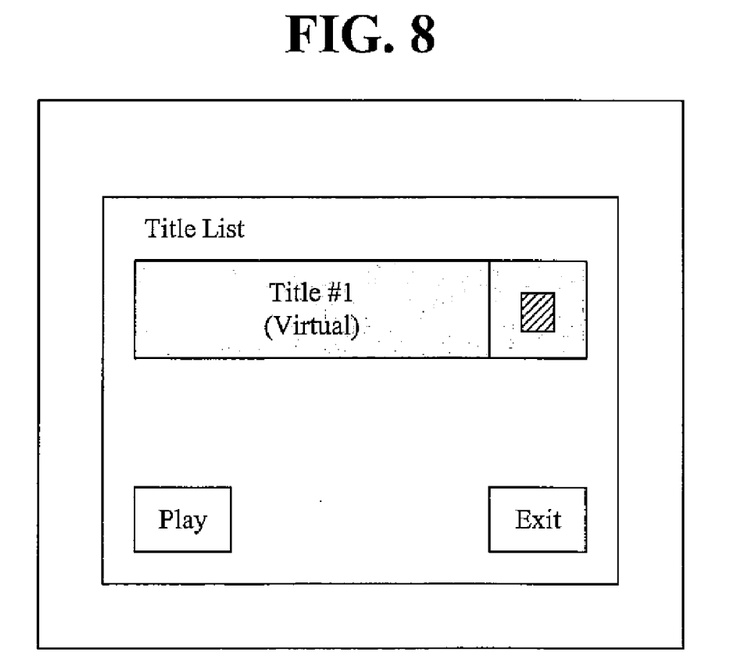

Further, the controller 20 creates and displays a corresponding title list screen by controlling the digital signal processor 17. For example, the title list screen may be implemented in such a way that the first title and the second title are separately displayed as a plurality of separate titles, as shown in FIG. 7, or in such a way that the first and second titles can be displayed as a single virtual title, representing the first and second titles, as shown in FIG. 8.

When the user selects any one from the first and second titles on the title list screen, on which titles are separately displayed, the controller 20 sequentially connects and reproduces the first and second titles. The user may also have an option to simply select one of the first and second titles on the title list screen to play only one of the first and second titles. Further, when the user selects a virtual title on the title list screen, on which a single virtual title is displayed, the controller 20 sequentially connects and reproduces the first and second titles.

Meanwhile, when recording failures occur two or more times during the recording of real-time input data, in other words, when two or more defective areas are present in the data area, three or more titles, which are separately recorded as different titles, may be connected and reproduced. For this operation, link information for indicating a title to be connected to the start of a given title, or a title to be connected to the end of the given title, or both titles to be connected to the start and end of the given title, may be included in the management information about each title. When more than two separated-but-linked titles are recorded, the user may also have options to simply select one of the separated-but-linked titles on the title list screen so as to (1) serially reproduce all of the separated-but-linked titles starting from the first title based on the link information for the titles, (2) serially reproduce the titles the link information for the titles, staring from the selected one of the separated-but-linked titles until a last one of the separated-but-linked titles is reproduced, or (3) reproduce the selected title only.

Figure 9:
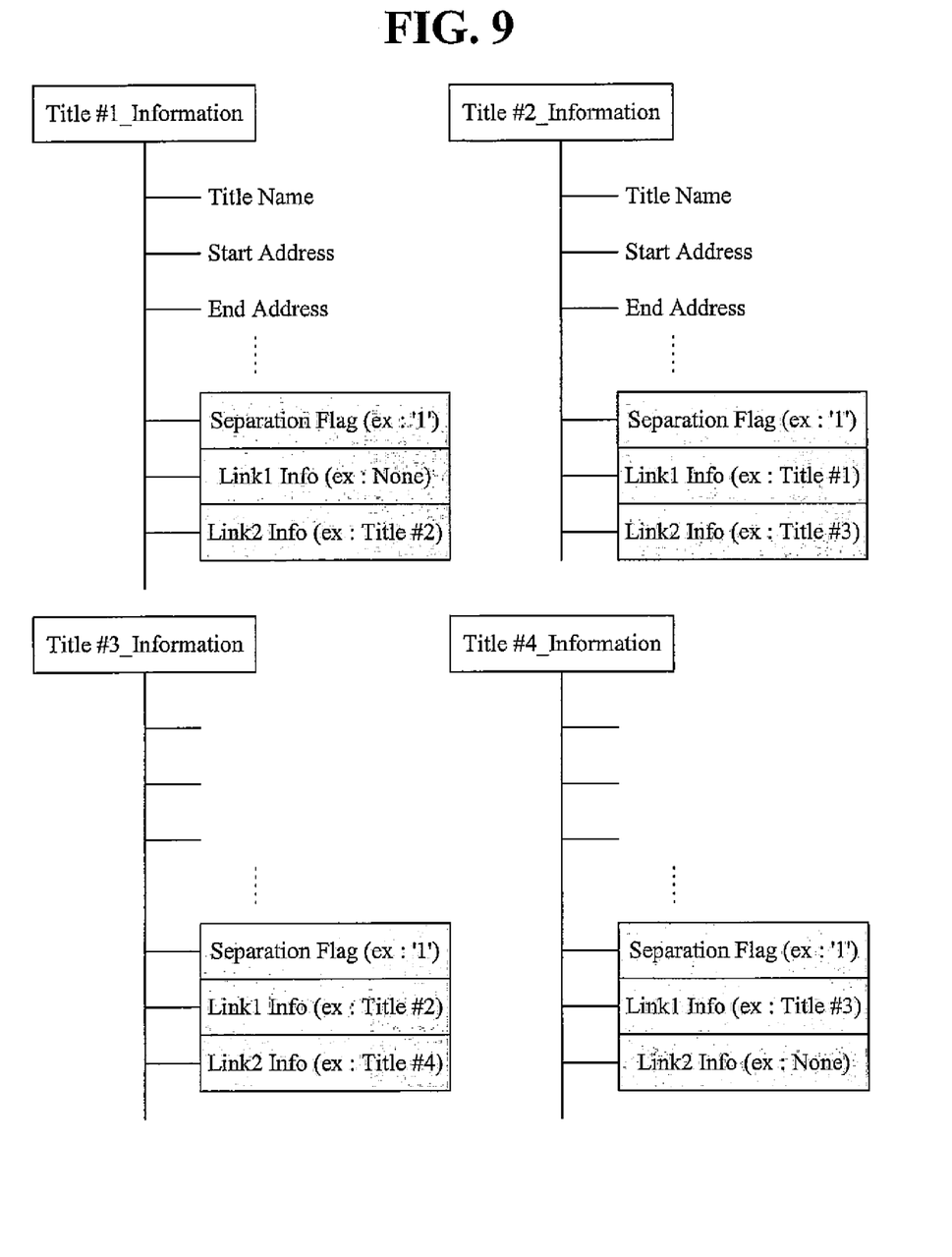
FIG. 9 is a diagram showing another embodiment in which link information is additionally recorded in title information.

Therefore, in an embodiment of the present invention, as shown in FIG. 9, the management information about each title may include first link information (Link1 Info) about a title to be connected to the start of a given title, and second link information (Link2 Info) about a title to be connected to the end of the given title.

Further, instead of additionally recording a separation flag in the management information about the title, characters, for example, 'SEP_' may be prefixed to the name of the title, thus indicating that a given title is a title that is separated due to a recording failure.

Therefore, the illustrated embodiment of the present invention are advantageous in that, even if a recording failure occurs during the recording of data, data that is input after the occurrence of a recording failure can be recorded without interrupting the recording of data, and the data recorded in this way can be serially reproduced.

Although the illustrated embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of reproducing data, comprising:
    checking management information for controlling reproduction of data recorded on a recording medium;
    displaying a plurality of titles on a screen as a single virtual title when link information for connecting the plurality of titles is included in the management information, wherein a first title of the plurality of titles is for data recorded before an occurrence of a recording failure and a second title of the plurality of titles is for data recorded after the occurrence of the recording failure, wherein a defective area having no data is located between the first title and the second title on the recording medium; and
    serially reproducing the first title and the second title of the plurality of titles connected through the link information when the single virtual title on the screen is selected.

2. The method according to claim 1, wherein the link information is included in the management information for each of the titles.

3. The method according to claim 2, wherein the link information further includes information indicating a title to be reproduced before a given title and/or a title to be reproduced after the given title.

4. The method according to claim 2, wherein the management information, including the link information, includes information indicating that a given title is a separated title.

5. The method according to claim 1, wherein the recording medium is an optical disc, and the management information for each of the titles is recorded in a file system area.

6. A method of reproducing data, comprising:
    checking management information for controlling reproduction of data recorded on a recording medium;
    displaying a plurality of titles on a screen as a plurality of separate titles when link information for connecting the plurality of titles is included in the management information, wherein a first title of the plurality of titles is for data recorded before an occurrence of a recording failure and a second title of the plurality of titles is for data recorded after the occurrence of the recording failure, wherein a defective area having no data is located between the first title and the second title on the recording medium; and
    serially reproducing the first title and the second title of the plurality of titles connected through the link information when any one from the first title and the second title on the screen is selected.

7. The method according to claim 6, wherein all of the plurality of titles connected through the link information are serially reproduced in conjunction with each other when reproduction of any one of the plurality of separate titles displayed on the screen is requested.

8. The method according to claim 6, wherein when reproduction of one of the plurality of separate titles displayed on the screen is requested, serially reproducing the separate titles starting from the requested one of the plurality of separate titles until a last one of the plurality of separate titles is reproduced.

9. The method according to claim 6, wherein the link information is included in the management information for each of the titles.

10. The method according to claim 9, wherein the link information further includes information indicating a title to be reproduced before a given title and/or a title to be reproduced after the given title.

11. The method according to claim 9, wherein the management information, including the link information, includes information indicating that a given title is a separated title.

12. The method according to claim 6, wherein the recording medium is an optical disc, and the management information is recorded in a file system area.

* * * * *